United States Patent
Noris et al.

(10) Patent No.: US 11,170,575 B1
(45) Date of Patent: Nov. 9, 2021

(54) COMFORTABLE NAVIGATION IN LARGE-SCALE VIRTUAL WORLDS WHEN CONSTRAINED BY SMALL-SCALE PHYSICAL ENVIRONMENT

(71) Applicant: Facebook Technologies, LLC, Menlo Park, CA (US)

(72) Inventors: Gioacchino Noris, Zurich (CH); Matthew James Alderman, Redmond, WA (US); Alexandru-Eugen Ichim, Zurich (CH)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/774,788

(22) Filed: Jan. 28, 2020

(51) Int. Cl.
  *G06T 19/00* (2011.01)
(52) U.S. Cl.
  CPC ........ *G06T 19/003* (2013.01); *G06T 2200/24* (2013.01)
(58) Field of Classification Search
  CPC . G06T 19/003; G06T 19/006; G06T 2200/24; G06F 3/011
  See application file for complete search history.

(56) References Cited

U.S. PATENT DOCUMENTS

| | | | |
|---|---|---|---|
| 2013/0335301 A1* | 12/2013 | Wong | G06F 3/167 345/8 |
| 2016/0178383 A1* | 6/2016 | Mays | G01C 21/3673 701/408 |
| 2016/0350973 A1* | 12/2016 | Shapira | G06F 3/017 |
| 2020/0294311 A1* | 9/2020 | Holz | G06T 19/20 |

* cited by examiner

*Primary Examiner* — Daniel F Hajnik
(74) *Attorney, Agent, or Firm* — Baker Botts L.L.P.

(57) ABSTRACT

In one embodiment, a method includes segmenting a layout of a physical space surrounding a user into physical segments; generating, based on the physical segments, virtual paths for a virtual environment through which the user can navigate by traveling the physical segments; identifying, based on a current location of the user with respect to the physical space, a portion of the physical segments for which to enable an intrusion detection feature; detecting a physical object in the portion of the physical segments that corresponds to a particular virtual path of the virtual paths; and in response to the detecting, displaying a representation of the physical object in the particular virtual path.

18 Claims, 5 Drawing Sheets

COMFORTABLE NAVIGATION IN LARGE-SCALE VIRTUAL WORLDS WHEN CONSTRAINED BY SMALL-SCALE PHYSICAL ENVIRONMENT

TECHNICAL FIELD

This disclosure generally relates to intrusion detection in a virtual environment that is based on a physical environment.

BACKGROUND

A virtual reality (VR) system can be designed to display in-application wall and floor markers when users get near boundaries they defined. When the user gets too close to the edge of a boundary, translucent boundary markers are displayed in a layer that is superimposed over the game or experience. Typically, a VR system can be set up within an area with limited play space, such as a room. Since the entire play space is sufficiently close to the user to impact safety, the alerting feature would be active throughout the entire boundary. However, when the user's play space includes not just a single room but also additional rooms and corridors, it would be undesirable to have the alerting feature of the entire play space boundary be activated. Alerting the user to potential hazards in other portions or segments of the play space would unnecessarily disrupt the user's experience, since those hazards are irrelevant to safety due to their proximity to the user. In addition, the associated computational and power-consumption costs for monitoring the distant areas and rendering the visual alerts would unnecessarily tax the device's limited resources.

SUMMARY OF PARTICULAR EMBODIMENTS

This application discusses a method for selectively activating a virtual reality boundary for hazard detection. The boundary may extend through different rooms and corridors. Depending on the user's current location, a virtual reality computing device may selectively activate a portion of the boundary around the user. The portion may be selected based on predefined segments of the boundary (e.g., a segment of the corridor with a particular geometric property, a room, etc.), a radius around the user, etc. The intrusion detection safety feature would only be active within the selected portion of the boundary. For example, only intrusions within the selected portion would trigger a safety alert, which could be surfaced to the user via a passthrough visual or depth point cloud of the intruding object. When the user gets too close to the edge of the boundary, only the visual representation of the edge of the selected portion of the boundary would be displayed. When the user moves outside of the boundary, the passthrough information displayed could also be limited to the room segment where the user is located.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g., method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
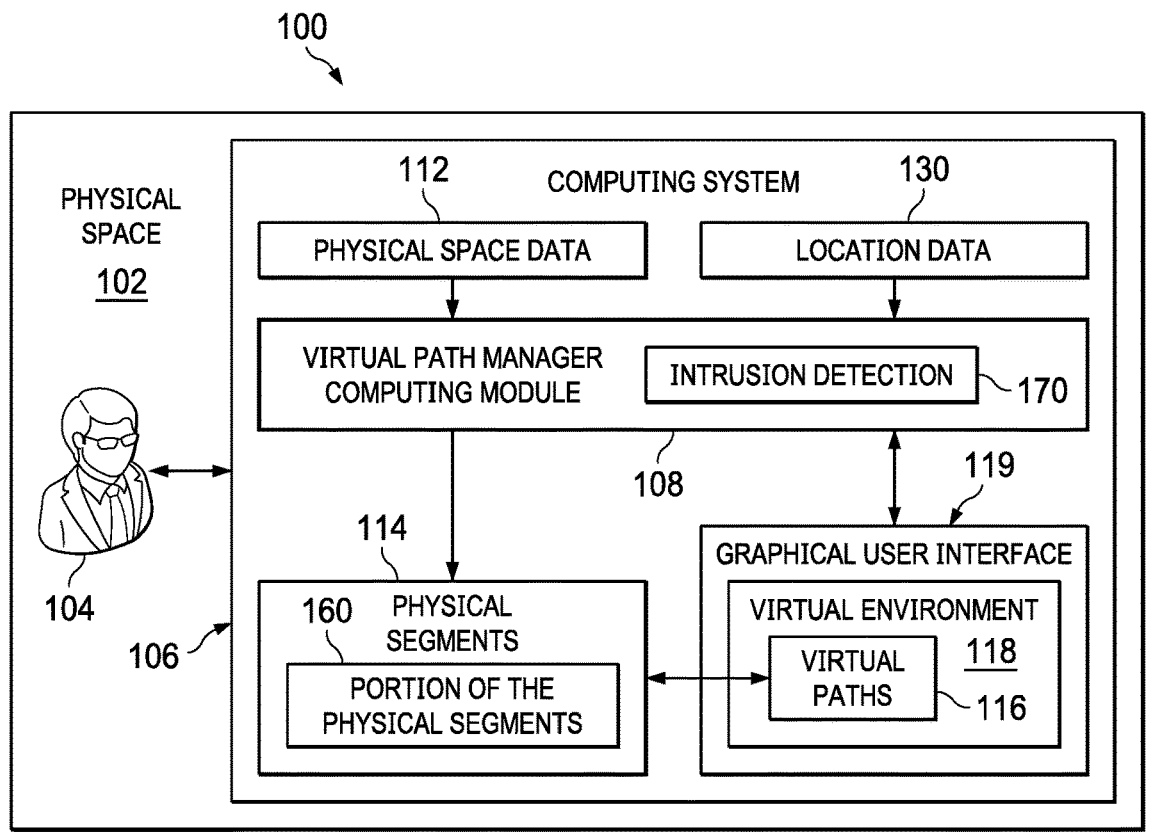
FIG. 1 illustrates an example environment for intrusion detection in a virtual environment.

FIG. 1 illustrates an environment 100 for intrusion detection in a virtual environment. The environment 100 can include a physical space 102 that can include a user 104 interacting with a computing system 106. In some examples, the computing system 106 can include a virtual reality computing system, an augmented reality computing system, or a mixed-reality computing system. The virtual path manager computing module 108 can include an intrusion detection computing module 170 that enables an intrusion detection feature.

The virtual path manager computing module 108 can receive physical space data 112 identifying a layout of the physical space 102 surrounding the user 104. For example, the computing system 106 can include a wearable computing device (such as a headset wearable computing device). The user 104 can travel (walk) about the physical space 102 such that the computing system 106 can identify the physical space 102 (e.g., utilizing a camera sensing module) to generate the physical space data 112 (e.g., a topology of the physical space 102).

Figure 2:
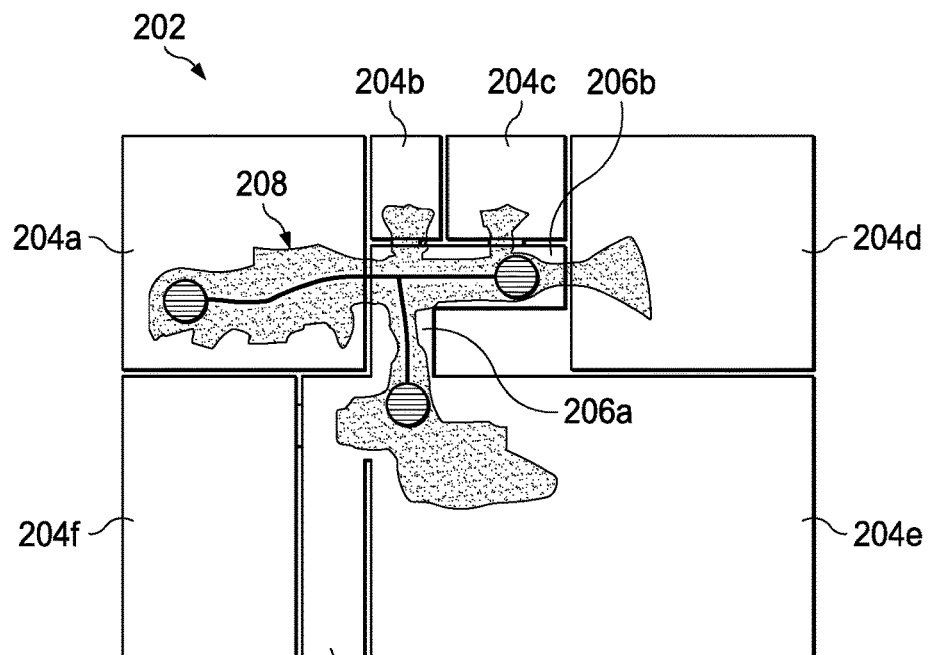
FIG. 2 illustrates an example physical environment.
Figure 3A:
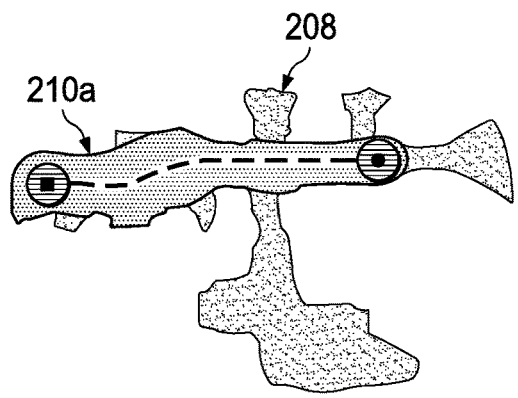
FIG. 3A, 3B, 3C illustrate example virtual paths.
Figure 3B:
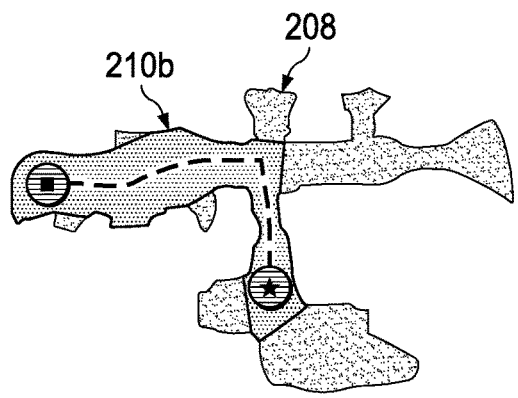
Figure 3C:
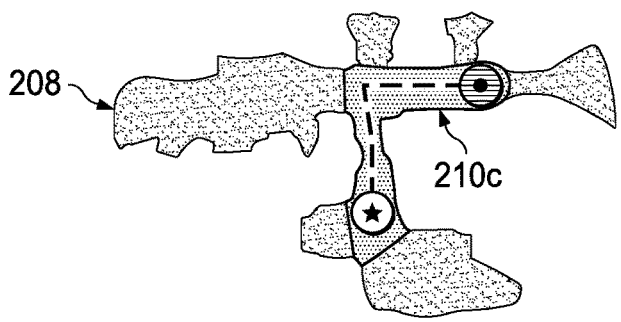

The virtual path manager computing module 108 can segment the layout of the physical space 102 surrounding the user 104 into one or more physical segments 114. Referring to FIG. 2, an environment 200 is illustrated. For example, the environment 200 can include multiple (physical) rooms 204a, 204b, 204c, 204d, 204e, 204f (collectively referred to as rooms 204) and hallways 206a, 206b, 206c (collectively referred to as hallways 206) connecting one or more of the rooms 204. To that end, as the user 104 walks about the environment 200, the virtual path manager computing module 108 can identify the layout of the physical space 208, similar to the physical space 102, included by the environment 200. Referring to FIGS. 3A, 3B, 3C, the virtual path manger computing module 108 can segment the layout of the physical space 208 into physical segments 210a, 210b, 210c (collectively referred to as physical segments 210). In some examples, a portion of one or more of the segments 210 can overlap with another segment 210 (e.g., the segment 210b overlaps with the segment 210a).

Figure 4:
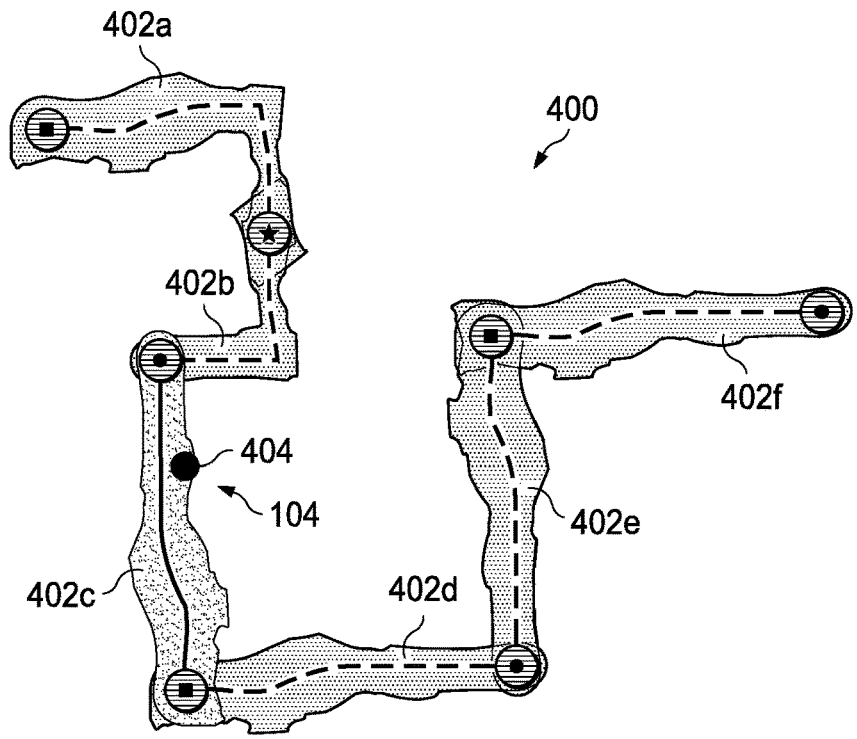
FIG. 4 illustrates connected virtual paths of a virtual environment.

Referring back to FIG. 1, the virtual path manager computing module 108 can generate, based on the physical segments 114, virtual paths 116 of a virtual environment 118 through which the user 104 can navigate by traveling the physical segments 114. Specifically, the virtual path manager computing module 108 can generate the virtual environment 118 for display on a graphical user interface (GUI) 119. Referring to FIG. 4, virtual paths of a virtual environment 400 is shown. Specifically, based on the physical segments 210 of FIGS. 3A, 3B, 3C, the virtual path manager computing module 108 can generate the virtual paths 402a, 402b, 402c, 402d, 402e, 402f (collectively referred to as virtual paths 402). The virtual paths 402d, 402e, 402f can be based on the physical segment 210a; the virtual path 402a can be based on the physical segment 210b; and the virtual path 402b can be based on the physical segment 210c. In some examples, the virtual paths 402 can be based on two of the physical segments 210, with the two physical segments 210 sharing a common point (or intersection).

Referring back to FIG. 1, the virtual path manager computing module 108 can display a particular virtual path 116 based on a location of the user 104 in the virtual environment 118. Specifically, the virtual path manager computing module 108 can provide for display on the GUI 119 a particular virtual path 116. For example, the display device computing module 120 can provide for display on the GUI the virtual path 402c.

Figure 5:
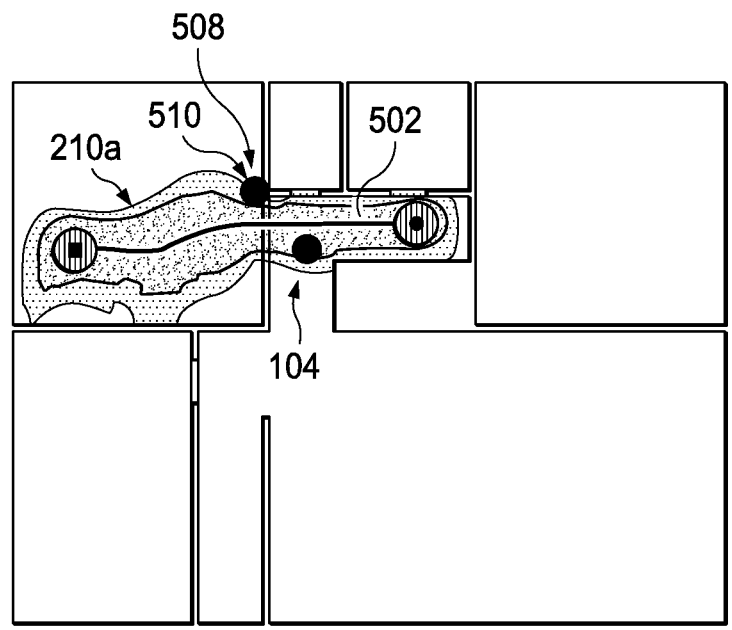
FIG. 5 illustrates a physical object within a virtual path of a virtual environment.

The virtual path manager computing module 108 can receive location data 130 of the user 104 with respect to the physical space 102. For example, as shown in FIG. 5, the user 104 is within the physical segment 210a at point 502. Furthermore, this corresponds to the location 404 of the user 104 within the virtual environment 118, as shown in FIG. 4.

The virtual path manager computing module 108 can identify, based on the location data 130, a portion 160 of the physical segments 114 from which to enable the intrusion detection computing module 170. For example, as the location data 130 indicates that the user 104 is within the physical segment 210a at the location 502, the virtual path manager computing module 108 can identify the physical segment 210a or a portion of the physical segment 210a for which to enable the intrusion detection computing module 170. In some examples, the virtual path manager computing module 108 identifies the portion of the physical segment 210a for which to enable the intrusion detection computing module 170 based on a distance from the user 104 at the point 502. For example, the distance could include 1 meter, 2 meters, or 3 meters.

The virtual path manager computing module 108, and specifically, the intrusion detection computing module 170, can detect a physical object in the portion 160 of the physical segment 114 that corresponds to the particular virtual path 116. Specifically, the virtual path manager computing module 108, and specifically, the intrusion detection computing module 170, can identify a location of a physical object in the portion 160 of the physical segment 114. For example, the virtual manager computing module 108 can identify a location 508 of a physical object 510 in the portion of the physical segment 210a for which the intrusion detection feature is enabled (or to be enabled). The virtual manger computing module 108 can determine a proximity of the user 104 with respect to the identified physical object 510. For example, the virtual computing module 108 can determine the proximity of the user 104 with respect to the identified physical object 510 within the physical segment 210a based on the location 508 of the identified physical object 510 and the location 502 of the user 104.

The virtual path manager computing module 108 can determine, based on the proximity of the user 104 with respect to the physical object located within the particular physical segment 114, that the user 104 is within a threshold distance of the physical object physically located within the particular physical segment 114. For example, the virtual path manager computing module 108 can determine, based on the proximity of the user 104 with respect to the physical object 510 located within the physical segment 210a, that the user 104 is within a threshold distance of the physical object 510. That is, the physical object 510 is within a threshold distance of the user 104, e.g., within 1 meter, 2 meters, 3 meters. To that end, the virtual path manager computing module 108 can detect the physical object in the portion of the physical segment 210a that corresponds to the virtual path 210a.

In some examples, the virtual path manager computing module 108, and specifically, the intrusion detection computing module 170, can detect the physical object in the portion 160 of the physical segment 114 that corresponds to the particular virtual path 116 after generating the virtual paths 116 for the virtual environment 118. That is, the physical object is absent from the physical space 102 when the virtual paths 116 for the virtual environment 118 that corresponds to the physical space 102 are initially generated. For example, the physical object 510 can be initially absent from the physical segment 210a when the virtual path manager computing module 108 initially generates the virtual path 402c that is based on the physical segment 210a. In other words, the physical segment 210a is initially exclusive of the physical object 510 when the virtual path 402c is generated by the virtual path manger computing module 108.

In some examples, the virtual path manager computing module 108 can identify a sightline of the user 104 with respect to the physical object in the portion 160 of the physical segment 114 that corresponds to the particular virtual path 116. For example, the sightline of the user 104 can include a visual axis that is unobstructed between the physical object and the user 104. For example, the virtual path manager computing module 108 can identify the sightline of the user 104 with respect to the physical object 510 in the physical segment 210a. To that end, the virtual path manager computing module 108 can determine that the user 104 is within the threshold distance of the physical object physically located within the particular physical segment 114 and within the sightline of the user 104. For example, the virtual path manager computing module 108 can determine, based on the proximity of the user 104 with respect to the physical object 510 located within the physical segment 210a and the sightline of the user 104 with respect to the physical object 510, that the user 104 is within a threshold distance of the physical object 510. That is, the physical object 510 is within a threshold distance of the user 104, e.g., within 1 meter, 2 meters, 3 meters, and within the sightline of the user 104.

The virtual path manager computing module 108, in response to detecting the physical object in the portion 160 of the physical segment 114 that corresponds to the particular virtual path 116, displays a representation of the physical object in the particular virtual path 116. For example, the virtual path manager computing module 108, in response to detecting the physical object 510 in the physical segment 210, displays a representation of the physical object 510 in the virtual path 402c. In some examples, the virtual path manager computing module 108 can update the GUI 119 to indicate a virtual outline of the physical object (e.g., the physical object 510). In some examples, the virtual path manager computing module 108 can conceal a representation of other physical objects in the remaining physical segments 114. That is, the virtual path manager computing module 108 can conceal representation of other physical objects in the physical segments 210b, 210c when displaying the representation of the physical object 510 in the virtual path 402c.

In some examples, the virtual path manager computing module 108 displays the representation of the physical object in the particular virtual path 116 in response to determining that the user 104 is within the threshold distance of the physical object. For example, the virtual path manager computing module 108 displays the representation of the physical object 510 in the virtual path 408c in response to determining that the user 104 is within the threshold distance of the physical object 510, e.g., within 1 meter, 2 meters, 3 meters.

In some examples, the virtual path manager computing module 108 displays the representation of the physical object in the particular virtual path 116 in response to determining that the user 104 is within the threshold distance of the physical object and that the physical object is located within the sightline of the user 104. For example, the virtual path manager computing module 108 displays the representation of the physical object 510 in the virtual path 408c in response to determining that the user 104 is within the threshold distance of the physical object 510, e.g., within 1 meter, 2 meters, 3 meters, and the physical object 510 is within the sightline of the user 104.

Figure 6:
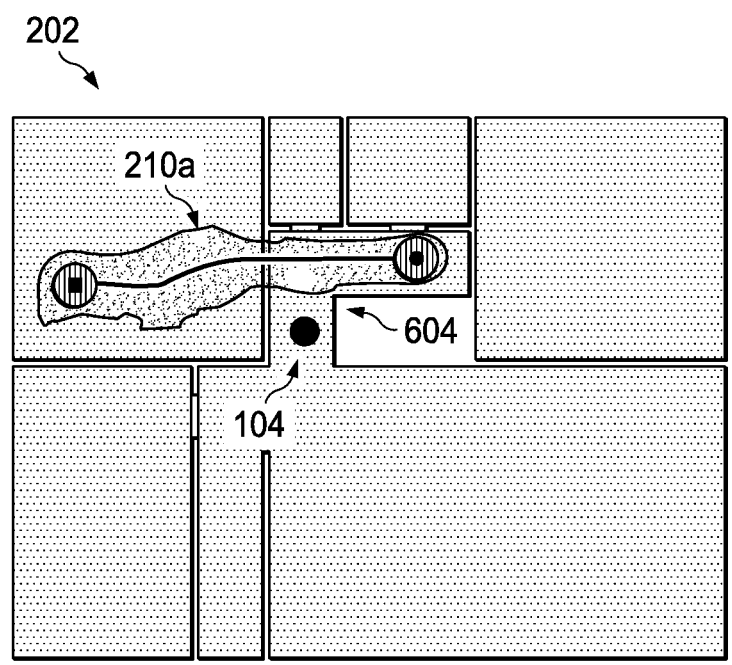
FIG. 6 illustrates a user outside of a virtual environment.

In some examples, the virtual path manager computing module 108 can determine, based on the current location of the user 104 with respect to the physical space (e.g., by the location data 130), that the user 104 is located outside of the physical segments 114 of the physical space 102. Referring to FIG. 6, the physical environment 202 is shown, including the physical segment 210a. Specifically, the user 104 is shown in the physical environment 202, but outside out of the physical segment 210a. The virtual path manager computing module 108 can, based on determining that the user 104 is outside of the physical segments 114, update the GUI 119 to correspond to the physical space that is outside of the physical segment that the user 104 is located in. For example, the virtual path manager computing module 108 can update the GUI 119 to correspond to the physical space 604 that the user 104 is located in that is outside of the physical segment 210.

In some examples, after displaying the representation of the physical object in the particular virtual path 116, the virtual path manager computing module 108 can display representation of an additional physical object in the particular virtual path 116. Specifically, the virtual path manager computing module 108 can identify, based on the location data 130, an additional portion of the physical segments 114 from which to enable an intrusion detection feature. The virtual path manager computing module 108 can detect an additional physical object in the additional portion of the physical segment 114 that corresponds to an additional virtual path 116. The virtual path manager computing module 108, in response to detecting the additional physical object in the additional portion of the physical segment 114 that corresponds to the additional virtual path 116, display a representation of the additional physical object in the additional virtual path 116. In some examples, the virtual path manager computing module 108 can cease to display the representation of the physical object in the particular virtual path 116 with concurrently displaying the representation of the additional physical object in the additional virtual path 116. In some examples, the portion of the physical segment 116 is adjacent to the additional portion of the physical segment 116.

Figure 7:
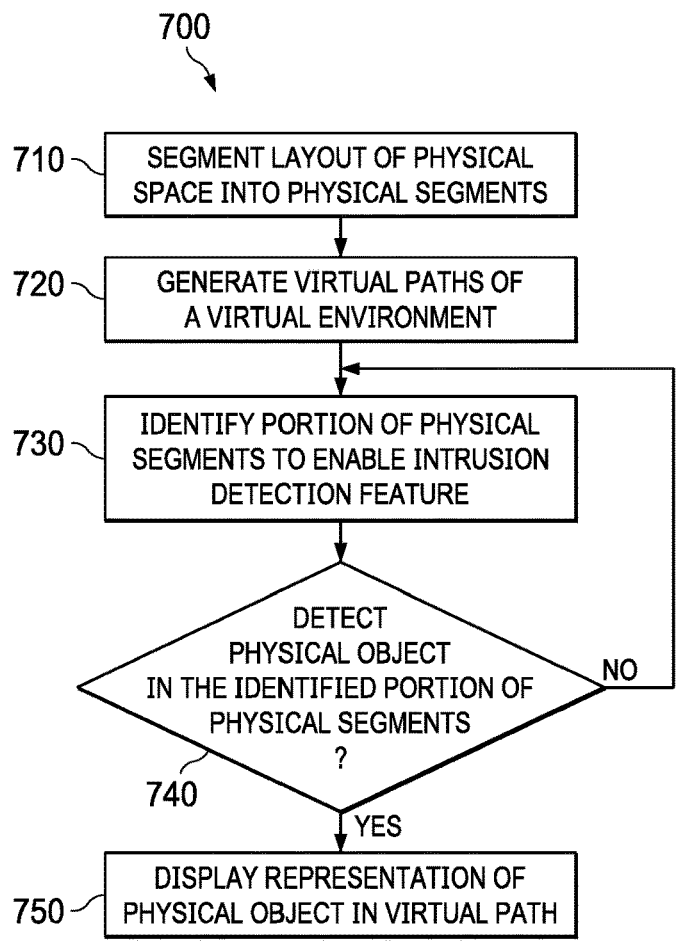
FIG. 7 illustrates an example method for intrusion detection in a virtual environment.

FIG. 7 illustrates an example method 700 for intrusion detection in a virtual environment. The method may begin at step 710, where the virtual path manager computing module 108 can segment the layout of the physical space 102 surrounding the user 104 into one or more physical segments 114. At step 720, the virtual path manager computing module 108 can generate, based on the physical segments 114, virtual paths 116 of a virtual environment 118 through which the user 104 can navigate by traveling the physical segments 114. At step 730, the virtual path manager computing module 108 can identify, based on the location data 130, a portion 160 of the physical segments 114 from which to enable an intrusion detection feature. At step 740, the virtual path manager computing module 108 can determine whether a physical object in the portion 160 of the physical segment 114 that corresponds to the particular virtual path 116 is detected. At step 750, if a physical object is detected, the virtual path manager computing module 108 displays a representation of the physical object in the particular virtual path 116. If a physical object is not detected, the method returns to step 730. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for intrusion detection in a virtual environment including the particular steps of the method of FIG. 7, this disclosure contemplates any suitable method for intrusion detection in a virtual environment including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
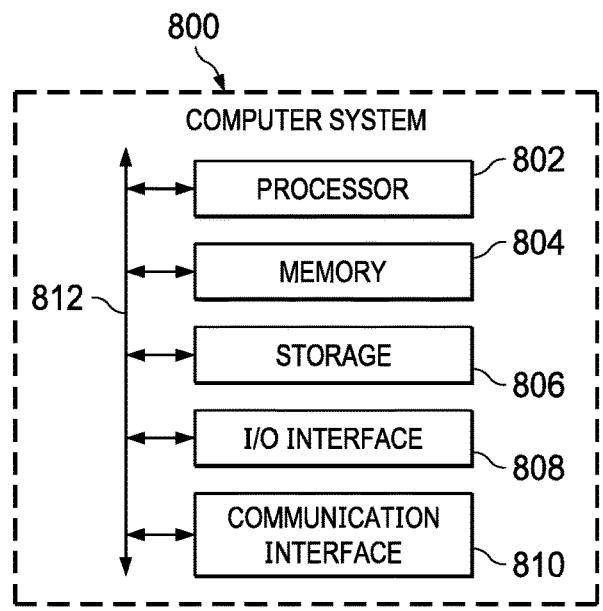
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 9:
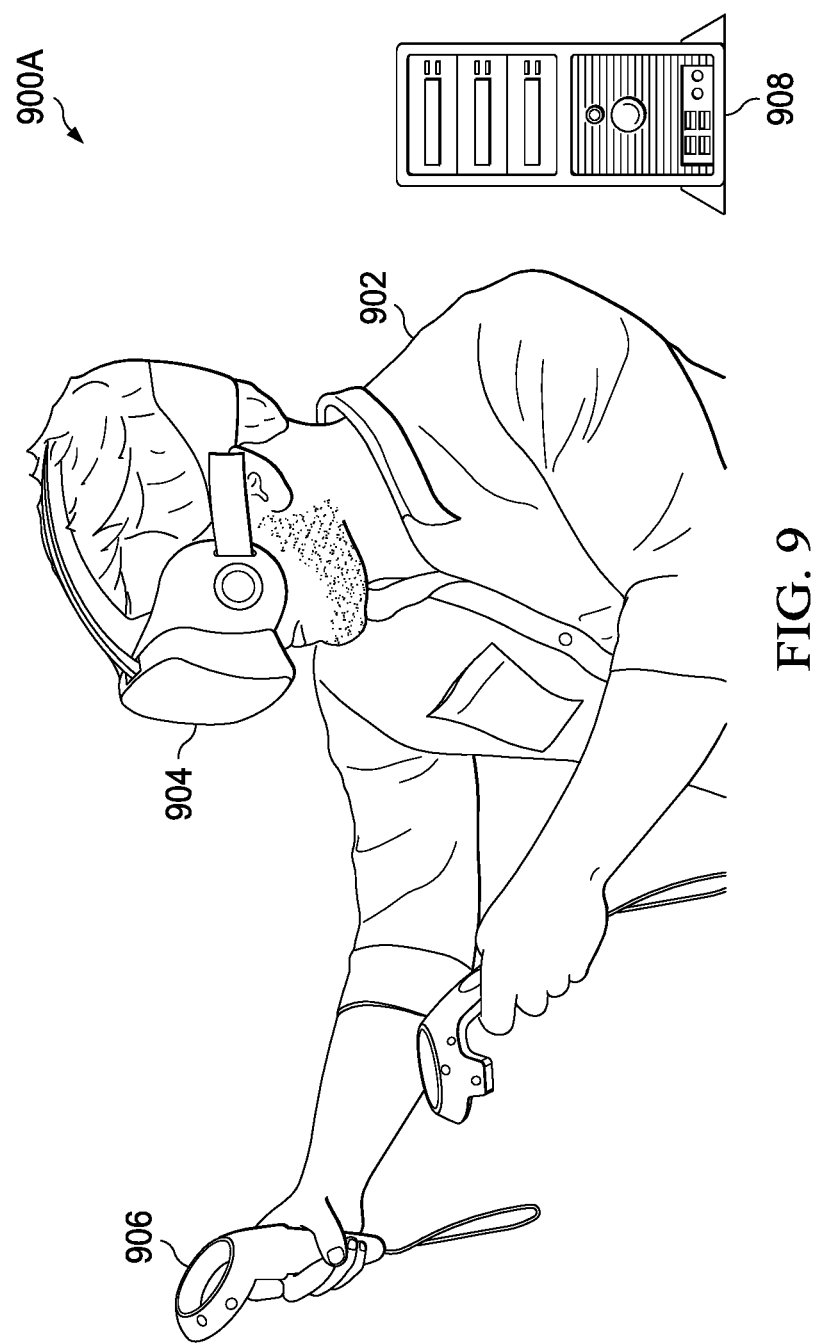
FIG. 9 illustrates an example artificial reality system.

FIG. 9 illustrates an example artificial reality system 900A. In particular embodiments, the artificial reality system 900A may comprise a headset 904, a controller 906, and a computing system 908, etc. A user 902 may wear the headset 904 that could display visual artificial reality content to the user 902. The headset 904 may include an audio device that could provide audio artificial reality content to the user 902. The headset 904 may include one or more cameras which can capture images and videos of environments. The headset 904 may include an eye tracking system to determine the vergence distance of the user 902. The headset 904 may be referred as a head-mounted display (HDM). The controller 906 may comprise a trackpad and one or more buttons. The controller 906 may receive inputs from the user 902 and relay the inputs to the computing system 908. The controller 906 may also provide haptic feedback to the user 902. The computing system 908 may be connected to the headset 904 and the controller 906 through cables or wireless connections. The computing system 908 may control the headset 904 and the controller 906 to provide the artificial reality content to and receive inputs from the user 902. The computing system 908 may be a standalone host computer system, an on-board computer system integrated with the headset 904, a mobile device, or any other hardware platform capable of providing artificial reality content to and receiving inputs from the user 902.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising, by a virtual-reality computing system:
   segmenting a layout of a physical space surrounding a user into physical segments;
   generating, based on the physical segments, virtual paths for a virtual environment through which the user can navigate by traveling the physical segments;
   identifying a particular physical segment of the physical segments that the user is located within, the particular physical segment corresponding to a particular virtual path of the virtual paths;
   activating an intrusion detection feature for the particular physical segment;
   while the user is navigating the particular virtual path by traveling the particular physical segment, detecting a physical object entering the particular physical segment that corresponds to the particular virtual path of the virtual paths;
   in response to the detecting, displaying a representation of the physical object in the particular virtual path;
   after displaying the representation of the physical object in the particular virtual path,
   i) identifying, based on an updated location of the user with respect to the physical space, an additional particular physical segment of the physical segments that the user is located within, the additional particular physical segment corresponding to an additional particular virtual path of the virtual paths;
   ii) activating the intrusion detection feature for the additional particular physical segment that the user is located within; and
   iii) detecting an additional physical object entering the additional particular physical segment, and in response, a) ceasing to display the representation of the physical object in the particular virtual path and b) displaying a representation of the additional physical object in the additional particular virtual path.

2. The computer-implemented method of claim 1, wherein detecting the physical object entering the particular physical segment that corresponds to the particular virtual path further comprises detecting the physical object entering the particular physical segment that corresponds to the particular virtual path after generating the virtual paths for the virtual environment.

3. The computer-implemented method of claim 2, wherein the particular physical segment is initially exclusive of the physical object when the virtual paths are generated.

4. The computer-implemented method of claim 1, further comprising:
   after detecting the physical object entering the particular physical segment that corresponds to the particular virtual path, identifying a proximity of the user with respect to the physical object in the particular physical segment.

5. The computer-implemented method of claim 4, further comprising:
   determining, based on the proximity of the user with respect to the physical object, that the user is within a threshold distance of the physical object.

6. The computer-implemented method of claim 5, further comprising:
   in response to determining that the user is within the threshold distance of the physical object, displaying the representation of the physical object in the particular virtual path.

7. The computer-implemented method of claim 5, further comprising:
   identifying a sightline of the user with respect to the physical object;
   determining that the user is within the threshold distance of the physical object and that the physical object is located within the sightline of the user; and
   in response to determining that the user is within the threshold distance of the physical object and that the physical object is located within the sightline of the user, displaying the representation of the physical object in the particular virtual path.

8. The computer-implemented method of claim 1, further comprising:
   determining, based on a current location of the user with respect to the physical space, that the user is located outside of the physical segments of the physical space;
   in response to determining that the user is located outside of the physical segments of the physical space, updating a graphical user interface (GUI) to correspond to additional physical space that is outside of the physical segments the user is located in.

9. The computer-implemented method of claim 1, further comprising:
   concealing representations of additional physical objects physically located in remaining physical segments of the physical space.

10. The computer-implemented method of claim 1, wherein
    the particular physical segment is adjacent to the additional particular physical segment.

11. A system comprising a processor having access to memory media storing instructions executable by the processor to:
    segment a layout of a physical space surrounding a user into physical segments;
    generate, based on the physical segments, virtual paths for a virtual environment through which the user can navigate by traveling the physical segments;
    identify a particular physical segment of the physical segments that the user is located within, the particular physical segment corresponding to a particular virtual path of the virtual paths;
    activate an intrusion detection feature for the particular physical segment;
    while the user is navigating the particular virtual path by traveling the particular physical segment, detect a physical object entering the particular physical segment that corresponds to the particular virtual path of the virtual paths;
    in response to the detecting, display a representation of the physical object in the particular virtual path; and
    after displaying the representation of the physical object in the particular virtual path,
    i) identify, based on an updated location of the user with respect to the physical space, an additional particular physical segment of the physical segments that the user is located within, the additional particular physical segment corresponding to an additional particular virtual path of the virtual paths;

ii) activate the intrusion detection feature for the additional particular physical segment that the user is located within; and iii) detect an additional physical object entering the additional particular physical segment, and in response, a) cease to display the representation of the physical object in the particular virtual path and b) display a representation of the additional physical object in the additional particular virtual path.

12. The system of claim 11, wherein detecting the physical object entering the particular physical segment that corresponds to the particular virtual path further comprises detect the physical object entering the particular physical segment that corresponds to the particular virtual path after generating the virtual paths for the virtual environment.

13. The system of claim 12, wherein the particular physical segment is initially exclusive of the physical object when the virtual paths are generated.

14. The system of claim 11, the instructions further comprising:

after detecting the physical object entering the particular physical segment that corresponds to the particular virtual path, identify a proximity of the user with respect to the physical object in the particular physical segment.

15. The system of claim 14, the instructions further comprising:

determine, based on the proximity of the user with respect to the physical object, that the user is within a threshold distance of the physical object.

16. The system of claim 15, the instructions further comprising:

in response to determining that the user is within the threshold distance of the physical object, display the representation of the physical object in the particular virtual path.

17. The system of claim 15, the instructions further comprising:

identify a sightline of the user with respect to the physical object;

determine that the user is within the threshold distance of the physical object and that the physical object is located within the sightline of the user; and in response to determining that the user is within the threshold distance of the physical object and that the physical object is located within the sightline of the user, display the representation of the physical object in the particular virtual path.

18. A non-transitory computer-readable medium storing software comprising instructions executable by one or more computers which, upon such execution, cause the one or more computers to perform operations comprising:

segment a layout of a physical space surrounding a user into physical segments;

generate, based on the physical segments, virtual paths for a virtual environment through which the user can navigate by traveling the physical segments;

identify a particular physical segment of the physical segments that the user is located within, the particular physical segment corresponding to a particular virtual path of the virtual paths;

activate an intrusion detection feature for the particular physical segment;

while the user is navigating the particular virtual path by traveling the particular physical segment, detect a physical object entering the particular physical segment that corresponds to the particular virtual path of the virtual paths;

in response to the detecting, display a representation of the physical object in the particular virtual path; and after displaying the representation of the physical object in the particular virtual path, i) identify, based on an updated location of the user with respect to the physical space, an additional particular physical segment of the physical segments that the user is located within, the additional particular physical segment corresponding to an additional particular virtual path of the virtual paths;

ii) activate the intrusion detection feature for the additional particular physical segment that the user is located within; and iii) detect an additional physical object entering the additional particular physical segment, and in response, a) cease to display the representation of the physical object in the particular virtual path and b) display a representation of the additional physical object in the additional particular virtual path.

* * * * *